(No Model.)

H. C. THOMSON.

ADJUSTABLE PEN REST FOR INKSTANDS.

No. 11,112. Reissued Sept. 23, 1890.

Witnesses.
W. E. Piper
A. F. Piper

Inventor.
Henry C. Thomson.
by S. N. Piper, atty.

THE NORRIS PETERS CO., PHOTO-LITHO., WASHINGTON, D. C.

UNITED STATES PATENT OFFICE.

HENRY C. THOMSON, OF BOSTON, MASSACHUSETTS.

ADJUSTABLE PEN-REST FOR INKSTANDS.

SPECIFICATION forming part of Reissued Letters Patent No. 11,112, dated September 23, 1890.

Original No. 430,446, dated June 17, 1890. Application for reissue filed August 16, 1890. Serial No. 362,252.

*To all whom it may concern:*

Be it known that I, HENRY C. THOMSON, a citizen of the United States, residing at Boston, in the county of Suffolk and State of Massachusetts, have invented certain new and useful Improvements in Adjustable Pen-Rests for Inkstands; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
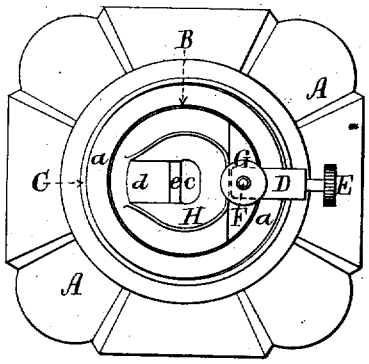
Figure 2:
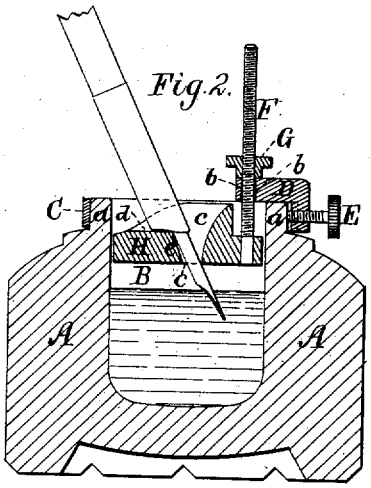
Figure 3:
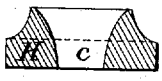
Figure 4:
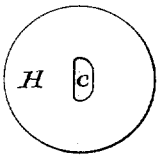

Figure 1 is a top or plan view, and Fig. 2 a vertical and median section, of an ink-well provided with my invention. Fig. 3 is a vertical section of the pen-rest, taken in a plane at right angles to that of Fig. 2. Fig. 4 is an under side view of said pen-rest.

The object of my invention is to provide a pen-rest that can be readily applied to ink-wells of ordinary construction and sustained in the well in such manner as to admit of easy adjustment in altitude therein to cause the pen when applied to the rest to enter the ink in the well the proper distance to keep said pen while in the rest suitably charged with ink and ready for use when required. The said pen-rest besides furnishing a convenient support for the pen also serves to nearly close the mouth of the well, and thus materially prevents evaporation of the ink.

In the drawings, A denotes the body or casing of an ink-well of common construction, and B the well therein, it being surrounded at top by a neck *a*, as usual. Said neck is shown as circular and concentric with the well; but it is often made rectangular instead of concentric. In either case I surround said neck with a band C, to which is fixed an arm D, said band and arm being clamped to the said neck by a screw E. In the arm D is a vertical hole *b*, in which a screw F is arranged to slide, a nut G, screwed on said screw, bearing on the arm and sustaining in the well the pen-rest and closure H, fixed to the lower end of the screw F, and by revolving the nut G said pen-rest can be raised or lowered in the well, as may be desired.

Within the pen-rest is a mouth or opening *c* to receive the pen, said opening flaring from its bottom upward, and usually a passage *d* leads through the said rest and into the opening *c*. The bottom of said passage *d*, being horizontal, or thereabout, furnishes a bearing for the end of the pen-holder when applied to the rest, as represented in Fig. 2, and supports it to advantage. The said passage *d* may, however, be dispensed with, the flaring mouth *c* answering to receive and support the pen and holder.

From the foregoing it will be seen that with my invention applied to an ink-well a pen and its holder can be supported in the well in such manner that by turning the nut G the rest H will be raised or lowered in the well and the said pen made to enter the ink a suitable distance to properly supply it with the ink and be ready for use when required. This way of supporting a pen is a great convenience and does away with frequent wiping of it, for as the pen is kept wet with the ink it cannot dry and thicken on the pen and cause it to corrode, as usual, it being intended that the pen when in the rest shall enter the ink about as represented in Fig. 2, and as the ink lowers in the well the rest H can be correspondingly lowered by turning the nut G. Furthermore, one side of the opening *c* is inclined, as shown at *e*, to support the pen or incline it toward the writer in position to be conveniently grasped by him when required.

What I claim is—

1. The arm D, secured to the well, the screw F, arranged to slide in said arm, the rest H, fixed to the screw and provided with the flaring mouth, and the nut G for varying the altitude of said rest, in combination with an ink-well, as and for the purpose set forth.

2. The arm D, applied to the well and provided with the passage *b*, the screw F, adapted to slide therein, the rest H, having the mouth *c* and passage *d* and fixed to the said screw, and the nut G for raising or lowering the rest, in combination with an ink-well, as and for the purpose explained.

3. The combination, with an ink-well, of the band C, provided with an arm D and clamp-screw E, the adjusting-screw F and nut G, and the rest H, fixed to screw F and provided with an opening to receive and support the pen, the altitude of the said rest in the well being regulated by turning the nut G, as explained.

4. The pen-rest H, provided with the opening *c*, passage *d*, and incline *e*, in combination with the screw F, fixed thereto, the nut G, the arm D, and the ink-well supporting the latter, all essentially as set forth.

5. In combination with an ink-well, the rest sustained in said well so as to be variable in altitude therein and adapted to support a pen with relation to the ink in said well, substantially as set forth.

In testimony whereof I affix my signature in presence of two witnesses.

HENRY C. THOMSON.

Witnesses:
S. N. PIPER,
J. H. S. STERN.